US012753832B2

(12) United States Patent
Dial et al.

(10) Patent No.: US 12,753,832 B2
(45) Date of Patent: Oct. 6, 2026

(54) LUBE CONTROL FLOW VALVES FOR VEHICLE REAR CASES AND DIFFERENTIALS

(71) Applicant: Sonnax Transmission Company, Bellows Falls, VT (US)

(72) Inventors: James A. Dial, Springfield, MO (US); Tanner Aberle, Bellows Falls, VT (US)

(73) Assignee: Sonnax Transmission Company, Bellows Falls, VT (US)

( * ) Notice: Subject to any disclaimer, the term of this patent is extended or adjusted under 35 U.S.C. 154(b) by 273 days.

(21) Appl. No.: 18/667,512

(22) Filed: May 17, 2024

(65) Prior Publication Data

US 2024/0392873 A1 Nov. 28, 2024

Related U.S. Application Data

(60) Provisional application No. 63/468,078, filed on May 22, 2023.

(51) Int. Cl.

| | |
|---|---|
| ***F16K 31/06*** | (2006.01) |
| ***F16H 57/04*** | (2010.01) |
| ***F16K 11/07*** | (2006.01) |
| ***F16K 49/00*** | (2006.01) |

(52) U.S. Cl.
CPC ..... *F16H 57/0412* (2013.01); *F16H 57/0483* (2013.01); *F16K 11/07* (2013.01); *F16K 31/0613* (2013.01); *F16K 49/007* (2013.01)

(58) Field of Classification Search
CPC ............. F16H 57/0409; F16H 57/0435; F16K 31/0613; F16K 11/07; Y10T 137/8671; Y10T 137/8658
See application file for complete search history.

(56) References Cited

U.S. PATENT DOCUMENTS

| | | | | |
|---|---|---|---|---|
| 6,634,377 | B1 * | 10/2003 | Stafford | F16H 61/0276 137/454.2 |
| 11,402,032 | B1 * | 8/2022 | Zuo | F15B 13/0444 |
| 2016/0218610 | A1 * | 7/2016 | Kozo | F16K 31/082 |
| 2021/0071766 | A1 * | 3/2021 | Yajima | F16K 11/07 |
| 2022/0136598 | A1 * | 5/2022 | Varvayanis | F16H 57/0413 251/58 |

* cited by examiner

*Primary Examiner* — Kelsey E Cary
(74) *Attorney, Agent, or Firm* — Andrus Intellectual Property Law, LLP

(57) ABSTRACT

A drop-in valve assembly for a lube flow control valve for an OE valve body. The OE valve body has a bore that communicates with a solenoid inlet port, first and second cooler inlet ports, and a first sump port. A sleeve is configured to be positioned in the bore. The sleeve has openings configured for fluidly communicating with the solenoid inlet port, the first and second cooler inlet ports, and the first sump port therethrough. A valve member is configured to be positioned in the sleeve in the bore and to axially move therein between first and second positions. Moving the valve member from the first position to the second position at least partially reduces fluid communication from the first cooler inlet port to the first sump port and at least partially increases fluid communication from between the first cooler inlet port and the second cooler inlet port.

20 Claims, 6 Drawing Sheets

LUBE CONTROL FLOW VALVES FOR VEHICLE REAR CASES AND DIFFERENTIALS

CROSS REFERENCE TO RELATED APPLICATION

This application claims the benefit of U.S. Provisional Patent Application No. 63/468,078, filed May 22, 2023, which is incorporated herein by reference in its entirety.

FIELD

The present disclosure relates to lube control flow valves for vehicle rear cases and differentials, and particularly lube control flow valves for replacing OE valves to improve flow.

BACKGROUND

In certain vehicle transmissions, control pressure is fed to the rear case/differential via a lube flow control valve (LFCV) 1. FIG. 1 illustrates an original equipment (OE) cooler return OE LFCV 1, and feed and exhaust to/from the LFCV. An SLT solenoid 2 provides fluid pressure to the OE LFCV 1 at the SLT inlet port 3. When there is no SLT solenoid 2 pressure being applied to the OE LFCV 1, an OE spring 4 holds the OE valve plunger 5 against the bottom 6 of the bore 7 in the OE valve body 8. In this position, the fluid pressure from first cooler path 9 flows through a valve exhaust or first sump port 11 back to a sump 10. This passage promotes transmission fluid cooling. The pressure from second cooler path 12 splits into two paths 12*a*, 12*b*. One path 12*a* travels directly to the rear case/differential lube path 13 and the other path 12*b* travels to and occupies the bore 7 in the OE valve body 8. Rear cases and differentials are known and thus not discussed in detail herein for brevity.

As SLT solenoid 2 pressure is introduced to the system, the OE LFCV 1 begins to shuttle toward the right against the OE spring 4 force. FIG. 2 illustrates the scenario when the OE LFCV 1 strokes fully against the OE spring 4 force and compresses the OE spring 4 due to SLT solenoid 2 pressure. In this position, pressure from first cooler path 9 is blocked by the valve plunger land 14 and can no longer exhaust to the sump 10, which can cause transmission fluid temperature to rise. The lube pressure from second cooler path 12 and the lube pressure from first cooler path 9 are both sourced directly from the cooler (not shown). However, prior to reaching the LFCV bore 7, lube pressure from second cooler path 12 travels through a smaller passage compared to that of the lube pressure traveling from first cooler path 9. As such, the pressure from first cooler path 9 has a higher flow rate and a higher overall pressure compared to the pressure from second cooler path 12. This forces the cooler pressure from first cooler path 9 to flow through the left-side inlet of the first cooler path split 12*a*. This increases the volume of cooler lube that travels to the rear case/differential via line 13.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure generally relates to a drop-in valve assembly for a lube flow control valve for an OE valve body, the OE valve body having a bore, an SLT solenoid inlet port in communication with the bore, first and second cooler inlet ports in communication bore, and a first sump port in communication with the bore. The drop-in valve has a sleeve configured to be positioned in the bore, wherein the sleeve has openings configured for fluidly communicating with the solenoid inlet port, the first and second cooler inlet ports, and the first sump port there-through. A valve member is configured to be positioned in the sleeve in the bore and to axially move therein between a first position and a second position, wherein moving the valve member from the first position to the second position at least partially reduces fluid communication from the first cooler inlet port to the first sump port and at least partially increases fluid communication from between the first cooler inlet port and the second cooler inlet port.

In certain examples, in the first position the valve member at least partially blocks the second cooler inlet port.

In certain examples, the OE valve body further comprises a dead passage in communication with the bore, further comprising an end plug also configured to be positioned in the bore with the sleeve and the valve member such that the end plug blocks the dead passage.

In certain examples, the valve member is biased towards the first position.

In certain examples, the openings in the sleeve are provided at least in part as castellations at an end thereof.

In certain examples, the valve member is configured such that in the first position the first cooler inlet port and the second cooler inlet port remain fluidly coupled within the sleeve and in the second position the first cooler inlet port and the first sump port remain fluidly coupled within the sleeve.

In certain examples, the valve member has a first section, an adjacent second section, an adjacent third section of a third diameter less than the second diameter, and an adjacent fourth section of a fourth diameter that is greater than the third diameter, wherein the third section is axially aligned with the first sump port when in the first position and the second section is axially aligned with the first sump port when in the second position.

In further examples, the third section is axially aligned with the first cooler inlet port when in the first position and when in the second position. In further examples, the fourth section is axially aligned with the second cooler inlet port when in the first position and axially non-aligned when in the second position.

In further examples, the second diameter and the fourth diameter are each smaller than an inner diameter of the sleeve, and the fourth diameter is smaller than the second diameter so as to correspondingly meter the fluid communication through the sleeve.

In further examples, an interior of the sleeve has a circular cross-section, and wherein the second section of the valve member has a non-circular cross-section so as to permit the fluid communication from the first cooler inlet port to the first sump port therebetween.

In certain examples, the OE valve body further comprises a second sump port in communication with the bore, further comprising an end plug configured to retain the sleeve and the valve member in the bore, wherein the second sump port remains in fluid communication with the bore via a passage within the end plug.

In certain examples, in the second position between 10% and 25% of the fluid communication from the first cooler inlet port flows to the first sump port.

Another aspect according to the present disclosure generally relates to a method for modifying a lube flow control valve for an OE valve body, the OE valve body having a bore, an SLT solenoid inlet port in communication with the bore, first and second cooler inlet ports in communication bore, and a first sump port in communication with the bore. The method includes removing an OE valve member from the bore and inserting a sleeve within the bore, wherein the sleeve has openings configured for fluidly communicating with the solenoid inlet port, the first and second cooler inlet ports, and the first sump port therethrough. The method further includes inserting a new valve member within the sleeve, the new valve member being configured to axially move within the sleeve between a first position and a second position, wherein moving the new valve member from the first position to the second position at least partially reduces fluid communication from the first cooler inlet port to the first sump port and at least partially increases fluid communication from between the first cooler inlet port and the second cooler inlet port.

In certain examples, the method further includes removing an OE end plug to gain access to remove the OE valve member from the bore, and inserting a new end plug in the bore to retain the sleeve and the new valve member therein, the new end plug having a greater length than the OE end plug.

In certain examples, the OE valve body further comprises a dead passage in communication with the bore, further comprising positioning the new end plug in the bore so as to fluidly block the dead passage.

In certain examples, the method further includes removing an OE spring configured to bias the OE valve member towards the first position, and installing a new spring to bias the new valve member towards the first position, the new spring differing from the OE spring in at least one of a length, a diameter, and a spring constant.

In certain examples, the OE valve body further comprises a third cooler inlet port in communication with the bore, further comprising blocking the fluid communication from the bore to the third cooler inlet port.

In certain examples, the lube flow control valve when modified is configured such that when the new valve member is in the second position between 10% and 25% of the fluid communication from the first cooler inlet port flows to the first sump port.

In certain examples, the OE valve body further comprises a second sump port in communication with the bore, further comprising fluidly coupling an interior of the sleeve with the second sump port via inserting an end plug having a passage therethrough into the bore.

It should be recognized that the different aspects described throughout this disclosure may be combined in different manners, including those than expressly disclosed in the provided examples, while still constituting an invention accord to the present disclosure.

Various other features, objects and advantages of the disclosure will be made apparent from the following description taken together with the drawings.

DESCRIPTION OF THE DRAWINGS

Examples are described with reference to the following drawing figures. The same numbers are used throughout to reference like features and components.

DETAILED DESCRIPTION

Figure 1:
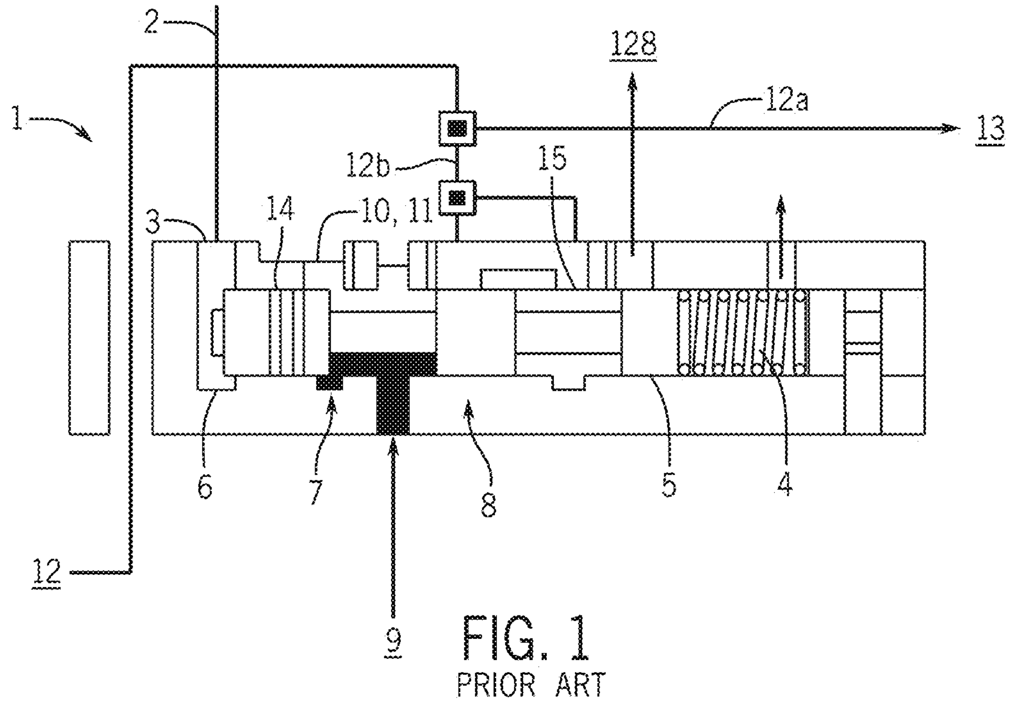
FIG. 1 PRIOR ART
FIG. 1 is a schematic illustration of an original equipment (OE) lube flow control valve and associated flow path or scheme.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

Figure 2:
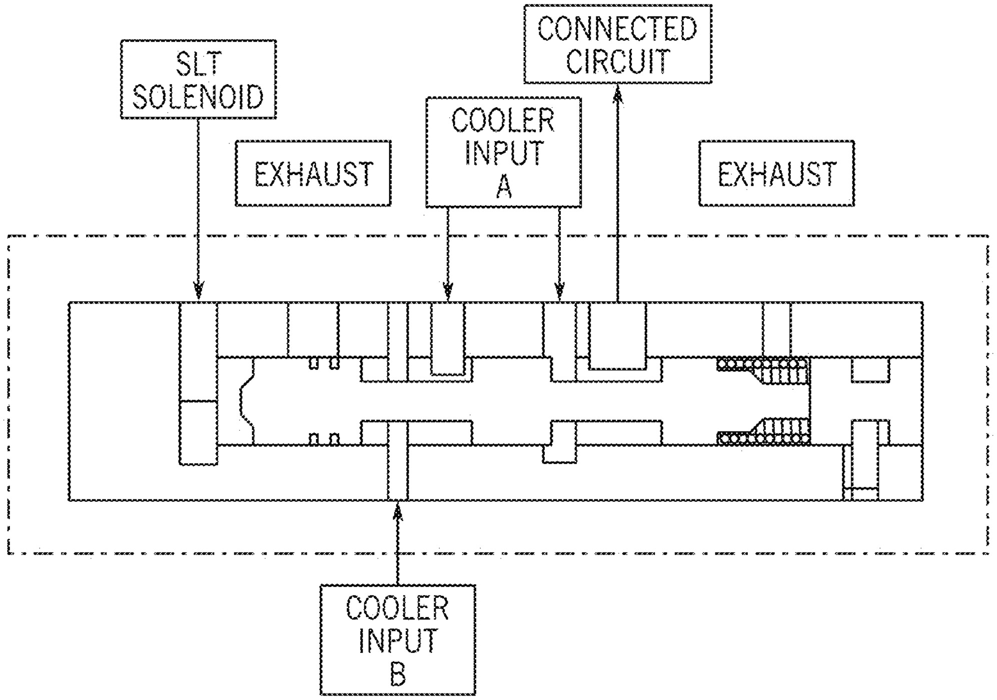
FIG. 2 PRIOR ART
FIG. 2 is an illustration of the OE lube flow control valve.

Referring briefly first to FIGS. 1 and 2, there are shown schematic illustrations of an OE LFCV 1 and lube flow paths, specifically to a vehicle rear case/differential via line 13. The present inventors have recognized that issues arise when severe bore wear at the SLT solenoid feed port (also referred to as an SLT inlet port) 3 allows SLT pressure to leak, and thus the OE LFCV 1 does not stroke fully to the right (against the OE spring 4 force). This limits the amount and consistency of lube flow that can travel to the rear case/differential via line 13. As a result, pressure loss caused by wear leads to rear case/differential issues and overheating due to inconsistent and/or a lack of adequate lubrication.

Additionally, the present inventors have recognized that since the valve is controlled by throttle pressure, anytime the operator fluctuates the gas pedal on and off, the valve is caused to stroke. However, if the vehicle is operated at a constant speed, the valve remains stuck in the fully stroked position and the exhaust to sump port is fully blocked. This does not allow any of the incoming cooler pressure to return to the sump and cool the circulating fluid. The consequence is an overheating transmission.

As such, the present inventors have identified a need for an assembly and/or kit for replacing the lube flow control valve that, along with a separator plate and valve bod modifications will provide sufficient lubrication to the rear case/differential. Desirably, such an assembly and/or kit reroutes lubrication from being cooler fed to being line pressure fed.

Figure 3:
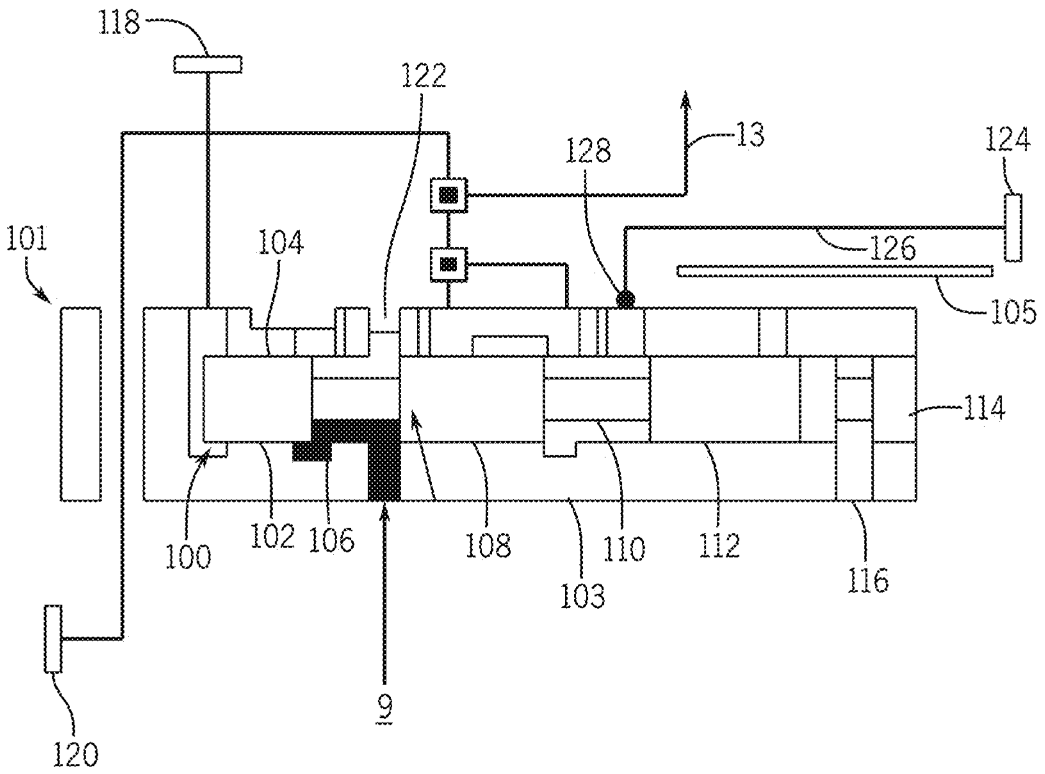
FIG. 3 is a schematic illustration of an embodiment of a drop-in valve assembly and improved lube flow control valve according to the present disclosure.

With reference to FIG. 3, the present inventors have developed new assemblies and methods for preventing the pressure loss, rear case/differential overheating, and lack of adequate lubrication for lube flow control valves known in the art, which advantageously may be used to upgrade or repair an existing lube control flow valve. FIG. 3 depicts one embodiment, which shows a modified LFCV 101 including a drop-in valve member 100 along with a modified version of the OE valve body 8, shown as modified valve body 103. Components of the LFCV 101 apart from the OE valve body 8 may also be referred to as a drop-in valve assembly. Unlike the OE valve plunger 5 shown in FIG. 1, the new valve member 100 is stationary in the modified valve body 103. The valve member 100 includes a head 102 that defines a first land 104 that is positioned in and blocks the SLT solenoid pressure port inlet 3, a first recess 106, an elongated second land 108, a second recess 110 and a tail 112. There is no spring, in contrast to the OE valve described above. The stationary valve member 100 extends fully through the LFCV bore 7 and along the modified valve body 103, and as such does not reciprocate.

The valve member 100 is configured to fit in the modified valve body 103 and to function as a blocker valve. In that there is no longer a spring in the modified LFCV 101, the valve member 100 does not stroke or reciprocate. Rather, the valve member 100 is stationary and is held in place by an end plug 114 and retaining clip 116. The end plug 114 and retaining clip 116 can be those as provided as OE components or can be new components.

To reroute flow to the rear case/differential via line 13, two plugs 118, 120 are installed (e.g., peened) into the corresponding separator plates (not shown) to block fluid pressure from both the SLT solenoid 2 and fluid pressure from the second cooler path 12. In this manner, lube pressure from the first cooler path 9 exhausts directly to the sump 10 via port 122 in the OE valve body 8. A cup plug 124 having a small orifice connects line pressure at line 126 to the valve bore 7 through a previously dead passage indicated at 128. This provides line pressure directly to the rear case/differential via line 13.

As noted above, in the OE operating scheme when the SLT solenoid applies pressure, a second cooler path 12, which splits, is routed, in part, to the rear case/differential lube via 12*a*, and in part via 12*b* to inlet ports in the LFCV. The first cooler path 9 enters the OE LFCV 1 and, due to a higher flow rate and pressure enters the second cooler path 12 and also flows to the rear case/differential lube flow path 13.

By the modified LFCV 101 and operating scheme, pressure from the SLT solenoid 2 is blocked at the SLT inlet port 3 by the head 102 or first and 104—since the valve member 100 is stationary and no longer moves, there is no need for SLT solenoid pressure. Pressure from the second cooler path 12 is blocked from entering the OE valve body 8 by plug 118. The first cooler path 9 (also referred to as a second cooler inlet port) is directed through the LFCV 101 and by position of the first land 104 is directed to the lube sump through the first exhaust port 10. A second exhaust to the sump previously in communication with the OE spring chamber is blocked by the valve member tail 112.

The previous dead passage 128 at the separator plate (shown exploded and only in part as 105) is opened by the cup plug 124 with the orifice, which is connected to line pressure at 126. This new passage 126 opens into the valve body 103 through a port at the second recess 110. Again, this routes line pressure through the LFCV 101 (and now stationary valve member 100) to the flow path to the rear case/differential via line 13. The now stationary valve member 100 is secured in place by the end plug 114 and retaining clip 116, such as a spring clip, which, again, can be OE components or new components.

It will be appreciated by those skilled in the art that an advantage of the present lube flow control valve 101 is that since the valve member 100 no longer strokes or reciprocates, there is no future wear for pressure to exhaust and leak from the valve bore 7. This increases the integrity and sufficiency of lubricant flow to the rear case/differential via line 13 in that line pressure, rather than pressure (or flow) from the cooler, is now fed to the rear case/differential to reduce or eliminate pressure losses caused by wear and rear case/differential issues and overheating due to inconsistent and/or a lack of adequate lubrication.

Figure 4:
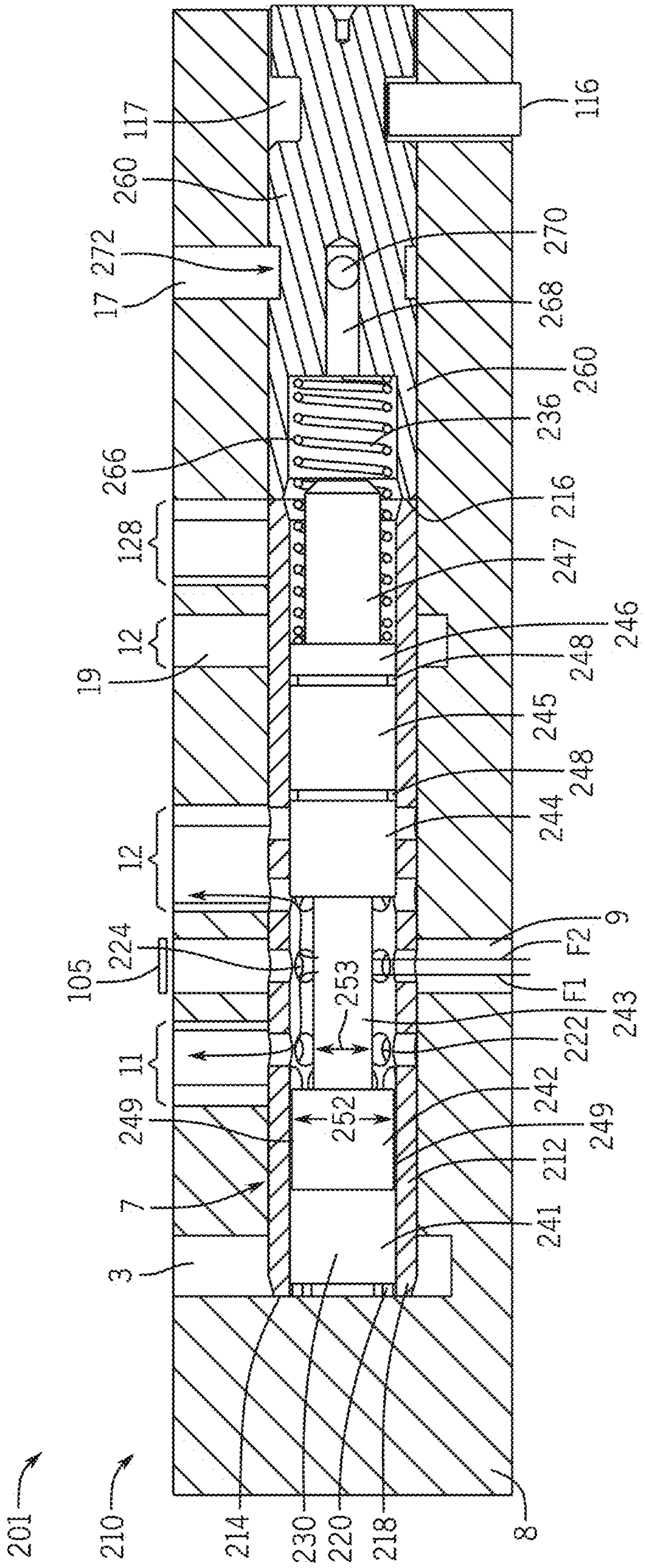
FIG. 4 is a schematic illustration of another embodiment of a drop-in valve assembly and improved lube flow control valve according to the present disclosure, shown in a first position.
Figure 5:
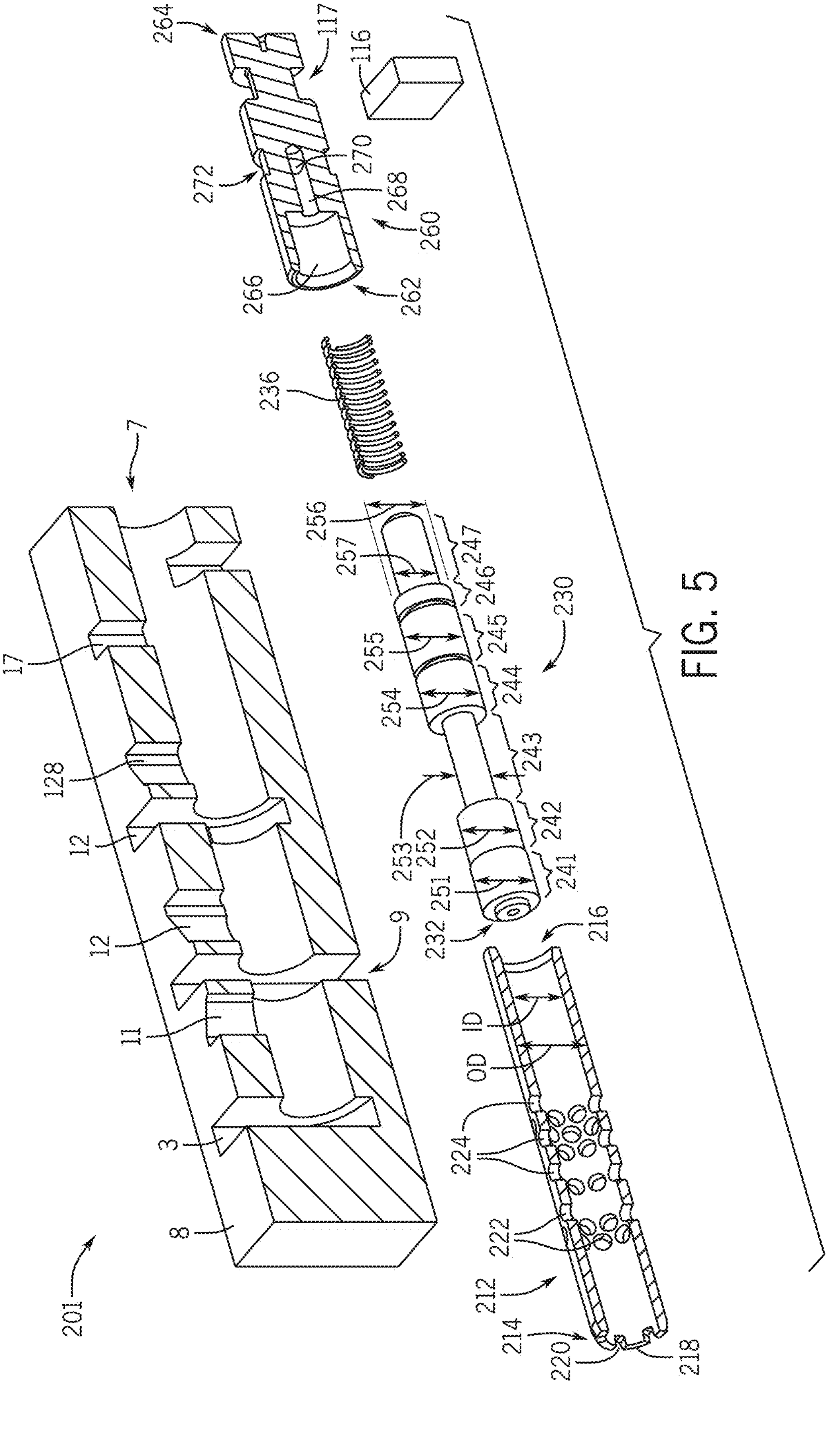
FIG. 5 is a sectional, exploded side view of the embodiment of FIG. 4.
Figure 6:
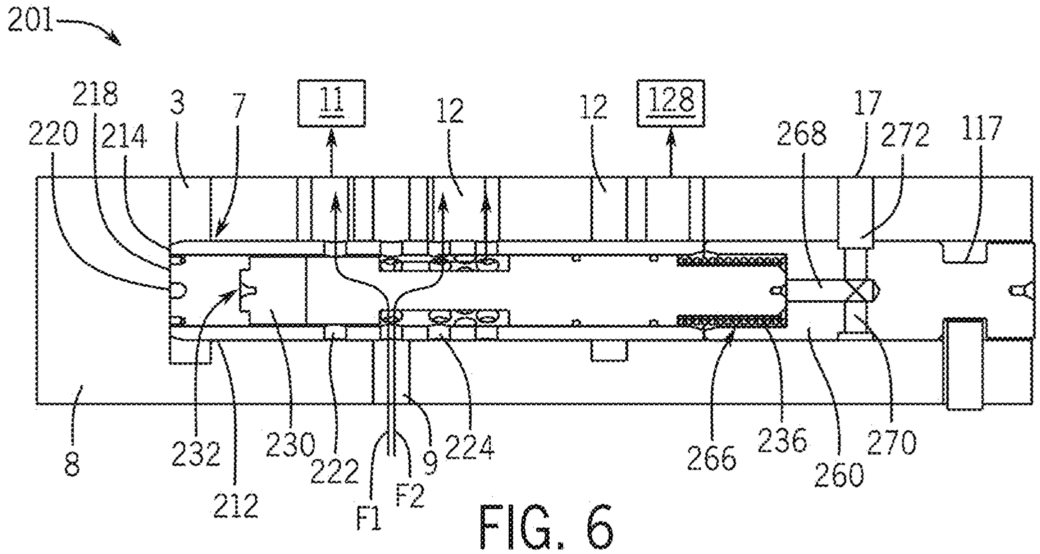
FIG. 6 is a schematic illustration depicting the drop-in valve assembly and improved lube flow control valve of FIG. 4 shown in a second position.

Another embodiment of a lube flow control valve LFCV 201 according to the present disclosure is shown in FIGS. 4-6, which is advantageously configured to utilize an existing OE valve body 8 such as shown in FIG. 1, either as an upgrade or a repair even after the bore of the OE valve body 8 has been worn. As described above, the OE valve body 8 has a bore 7, an SLT solenoid inlet port 3 in communication with the bore 7, first and second cooler inlet ports 9, 12 (also referred to cooler paths) in communication with the bore 7, and a first sump port 11 in communication with the bore 7. It should be recognized that the terms "first" and "second" are used merely for convenience and are not limiting. For example, a claimed feature including the term "first" may refer to an element described in the Detailed Description as "second" and/or the like. A second sump port 17 is also provided in communication with the bore 7. It should be recognized that the upper end of the first cooler inlet port 9 is effectively closed by the separator plate (shown exploded and only in part as 105).

The LFCV 201 includes a drop-in valve assembly 210 configured to be used with the OE valve body 8. The drop-in valve assembly 210 includes a sleeve 212 configured to be positioned in the bore 7 of the OE valve body 8. The sleeve 212 advantageously eliminates the issues of wear in the bore 7 by providing a new, smooth surface for which the valve member 230 may be positioned and axially slide therein, as discussed further below. The sleeve 212 extends elongated from a first end 214 to a second end 216. The sleeve 212 is substantially cylindrical in shape with walls that separate an interior from an exterior. In the embodiment shown, castellations 218 are provided at the first end 214 of the sleeve 212, which as described below serve as openings 220 through which fluid may flow or be communicated into and out of the sleeve 212. Openings near the first end 214 other than as castellations are also contemplated. The sleeve 212 is configured such that when positioned in the bore 7, the openings 220 fluidly communicating with the SLT inlet port 3. Additional openings 224 and 222 through the walls of the sleeve 212 provide for fluid communication with the first and second cooler inlet ports 9, 12, and the first sump port 11, respectively. In certain embodiments, the sleeve 212 is configured to block the dead passage 128 in the OE valve body 8. By way of example, the sleeve 212 and valve member 230 may be made of aluminum, steel, and/or other materials (which may be the same or different from each other).

Similarly, in certain embodiments the sleeve 212 is configured to block one of the second cooler inlet ports 12, shown in FIG. 4 as port 19. The fluid coming in via the second cooler inlet ports 12 in the OE configuration does not influence the valves stroking motion, nor does it travel to a different circuit. Instead, it simply fills the bore 7 and the connected circuit path and then back feeds into the rear case/differential. In view of this, the present inventors have recognized that the sleeve 212 may be configured to eliminate this unnecessary back feed step by blocking the surplus port 19 and the dead port 128, allowing fluid to travel directly to the rear case/differential. Since these two ports have been blocked, the valve (discussed further below) may advantageously be shortened and function with only 2 critical spools (i.e., the first section 241 and the combination of sections 244-246) in comparison to the three critical spools n the OE valve. It should be recognized that the dead port 128, or both the dead port 128 and the surplus port 19, may alternatively be blocked by the end plug 260 described below to the same effect.

A valve member 230 is configured to be positioned in the sleeve 212 in the bore 7 and to axially move therein between a first position (as shown in FIG. 4) and a second position (as shown in FIG. 6). The valve member 230 extends between a first end 232 and a second end 234 with different sections 241-247 defined therebetween. The different sections may have varying diameters. In the embodiment shown, the first section 241 has a first diameter 251 that is greater than a second diameter 252 of a second section 242 adjacent to the first section 241. The second diameter 252 being smaller than the first diameter 251 allows fluid to flow axially and circumferentially around the second section 242 by virtue of the gap 249 between the valve member 230 and the sleeve 212 in the second section 242 (see flow arrow F1 in FIG. 7).

With particular reference to FIG. 5, the second diameter 252 is greater than a third diameter 253 of a third section 243 adjacent to the second section 242. A fourth diameter 254 of a fourth section 244 adjacent to the third section 243 is greater than the third diameter 253. In the embodiment shown, the diameters 255, 256 of fifth and sixth sections 245, 246 are equal to the fourth diameter 254, but greater than a seventh diameter 257 of a seventh section 247, which here is greater than the third diameter 253. Accordingly, the sections 244-246 may also be referred to as a single section. The fourth diameter 254 in the embodiment shown is greater than the second diameter 252, and in the embodiment shown is equal to or approximately equal to the first diameter 251. In embodiments in which the fourth diameter 254 is less than the first diameter 251, a gap 259 may remain between the fourth section 244 and the sleeve 212, which if the fourth diameter 254 is greater than the second diameter 252 would be less than the gap 249. The region in which such a gap 259 would be positioned is shown in the figures. However, it is important to note that in the embodiment shown the gap 259 is approximately zero, whereby the fourth diameter 254 is only slightly smaller than the inner diameter ID of the sleeve 212 (e.g., sized for tolerances to permit tight sliding therein). The second section 242 (and in certain examples, the fourth section 244 and sections 245-246) may also be referred to as "undercut". The gaps are selected such that the volumes between the respective sections of the valve member 230 and an inner diameter ID of the sleeve 212 provides the desired metering of flow therethrough.

It should be recognized that the gaps 249, 259, as well as the sizes of the openings 220, 222, 224 in the sleeve 212 can advantageously be sized to meter the flow of fluid through the LFCV 201 as desired. By way of non-limiting example, the diameters 251-257 of the section 241-247 may be as follows: Ø 251=Ø 0.2536"; Ø 252=Ø 0.2440"; Ø 253=Ø 0.140"; Ø 254=Ø 0.2536"; Ø 255=Ø 0.2536"; Ø 256=Ø 0.2536"; and Ø 257=Ø 0.180. However, other sizes are contemplated by the present disclosure, which for example may vary as a function of the inner diameter ID of the sleeve 212, material selections, and/or other factors. The seventh section 247 functions as a stem for retaining a spring 236 that is similar to the OE spring 4 of FIG. 1, but configured to accommodate the differently sized valve member 230 and end plug 260 (FIG. 4) to be discussed further below. By way of example, the new spring may vary from the OE spring as a function of wire diameter, OD, the number of coils, the length, and/or others.

Figure 7:
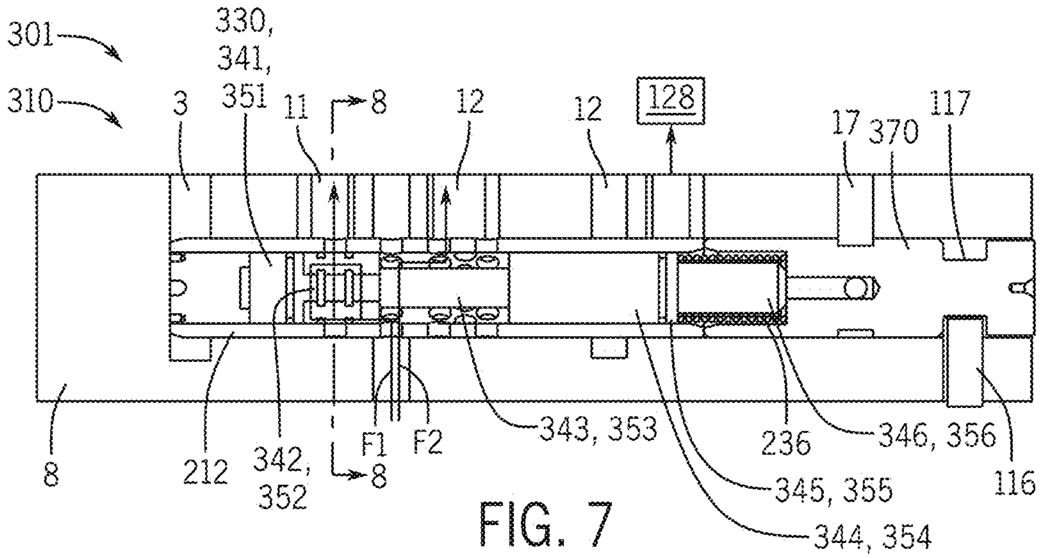
FIG. 7 is a schematic illustration depicting another embodiment of drop-in valve assembly and improved lube flow control valve according to the present disclosure, shown in a second position.
Figure 8:
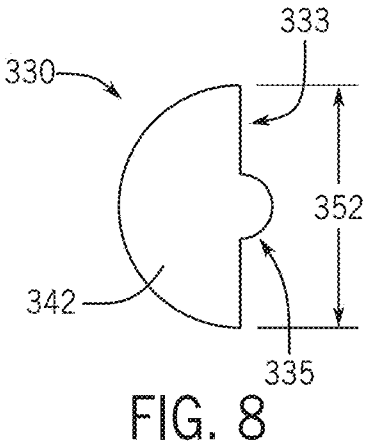
FIG. 8 is a sectional side view taken along the line 8-8 in FIG. 7.

It should be recognized that the term diameter does not necessarily limit the corresponding portion of the valve member 230 to have a circular cross-section, but is merely used for brevity. For example, the embodiment of LFCV 301 shown in FIGS. 7 and 8 show the second section 342 of the valve member 330 have a non-circular cross-section, here having a flat face 333 shaped so as to allow fluid to flow thereacross between the first cooler port 9 and the first sump port 11. This allows the second section 342 to have a second diameter 352 that is no less than the first diameter 351 since there is an alternate pathway. Reinforcements may be provided at different positions along the flat face 333 (e.g., not being flat) as needed for additional strength and/or to regulate the flow rate across the flat face 333.

In addition to having the flat face 333, the embodiment of FIGS. 7 and 8 also includes different numbers and placement of annual grooves 348 as compared to annular grooves 248 of the valve member 230. These annular grooves help to center the valve members 230, 330 within the bore 7. Further configurations are also contemplated by the present disclosure. It should further be recognized that the different sections of different valve members 230, 330 may be interchanged with each other. For example, the fourth section 344 of the valve member 330 is as axially long as the combination of the fourth section 244 and fifth section 245 of the valve member 230. Further configurations could combine the flat face 333 of the valve member 330 with the fourth section 244 and fifth section 245 of the valve member 230, etc. For the sake of brevity, all such combinations are not expressly shown and described.

Returning to FIGS. 4-5, the drop-in valve assembly 210 further includes an end plug 260 that has similar functions to the end plug 114 of FIG. 3 in retaining the valve member 230 in the bore 7, which may itself be held in place by a retaining clip similar to the OE retaining clip 116 (see FIG. 3). The end plug 260 extends between a first end 262 and a second end 264. An opening 266 is provided in the first end 262 and is configured to receive the second end 234 of the valve member 230, as well as the spring 236 therein. The spring 236 abuts the sixth section 246 of the valve member 230 and a bottom 268 of the opening 266 so as to bias the valve member 230 away from the end plug 260 (i.e., and thus towards the first position as shown in FIG. 4).

In certain embodiments, the end plug 260 further includes a passage 268 that is fluidly coupled to the opening 266. The passage 268 here extends axially down the center of the end plug 260. An opening 270 extends radially from the passage 268 to an annular groove 272 within the outer diameter of the end plug 260. The end plug 260 is configured such that, when fixed within the bore 7 by the clip 116, the opening 270 is aligned so as to be fluidly coupled with the second sump port 17 in the OE valve body 8. This allows any fluid that leaks or otherwise travels into the opening 266 to drain out via the second sump port 17 via the passage 268, opening 270, and annular groove 272, which would otherwise create further resistance to the valve member 230 moving towards the second position (i.e., in addition to the spring 236). In this manner, the second sump port 17 remains in fluid communication with the bore 7 through the end plug 260. A second annual groove 117 is formed in the outer diameter of the end plug 260 to receive the clip 116 therein for retaining the end plug 260, and thus the valve member 230, sleeve 212, and spring 236, within the bore 7. The present disclosure also contemplates configurations in which the end plug 370 is not fluidly coupled with the second sump port 17 therethrough (see FIG. 7).

Returning to FIGS. 4-6, additional information is now provided for how the LFCV 201 may function in practice. The valve member 230 remains moveable via control of the SLT solenoid controlling the pressure in the SLT inlet port 3, as with the OE LFCV 1. In the first position, the third section 243 is axially aligned with the first sump port 11, which due to having a relatively small diameter 253 allows substantial flow from the first cooler inlet port 9 to the first sump port 11 (shown as flow arrow F1). In this first position, the valve member 230 is also at least partially axially aligned with the second cooler inlet port 12 of the OE valve body 8, which can also be referred to as at least partially blocking the second cooler inlet port 12. It should be recognized that the two separate ports corresponding to the second cooler inlet port 12 are generally described together, and thus partially blocking may mean partially at least one of these ports.

Pressure from the SLT inlet port 3 causes the valve member 230 to shuttle towards the right into the second position (FIG. 6). Moving the valve member 230 from the first position to the second position causes the second section 242 to be at least partially axially aligned with the first sump port 11. Since the second section 242 has a larger second diameter 252 than the third diameter 253 of the third section 243, moving to the second position at least partially reduces fluid communication from the first cooler inlet port 9 to the first sump port 11 (represented as flow arrow F1). In other words, the gap 249 between the second section 242 and the sleeve 212 allows some flow therethrough, but this flow is substantially reduced as compared to the flow arrow F1 in the first position.

Likewise, moving to the second position causes the third section 243 to be at least partially aligned with (or more aligned with) the second cooler inlet port, which increases the fluid communication from between the first cooler inlet port 9 and the second cooler inlet port 12 (represented as flow arrow F2). Similarly, the fourth section 244 is axially aligned with the second cooler inlet port 12 when in the first position and axially non-aligned when in the second position. As shown in FIG. 6, the third section 243 of the valve member 230, which has the smallest third diameter 253, is aligned with multiple rows of openings 224 of the sleeve 212, which are aligned with openings to flow to the second cooler path 12. This results in additional fluid flow to the rear case and/or differential as needed.

In certain embodiments, in the second position between 10% and 25% of the fluid communication from the first cooler inlet port 9 flows to the first sump port 11, which becomes closer to 100%, for example between over 75%, over 80%, over 85%, over 90%, over 95%, or other percentages when in the first position. Through experimentation, the present inventors have identified that 20%±2% is particularly advantageous in avoiding overheating problems when in the second position, ensuring that there is always sufficient flow of the fluid circulates to the sump 10 (FIG. 1) to achieve cooling needs.

In certain embodiments, the valve member 230 is configured such that in the first position the first cooler inlet port 9 and the second cooler inlet port 12 remain fluidly coupled within the sleeve 212 and in the second position the first cooler inlet port 9 and the first sump port 11 remain fluidly coupled within the sleeve 212. As discussed above, the present inventors have recognized that it is advantageous to permit at least a small flow of the fluid to both the first sump port 11 and to the first cooler inlet port 9 in both positions of the valve member 230.

In this manner, the presently disclosed assemblies ensure that sufficient flow is provided to both the sump and the rear case and differential so as to avoid the problems described above, while also providing a solution for using existing (and even worn) OE valve bodies.

Figure 9:
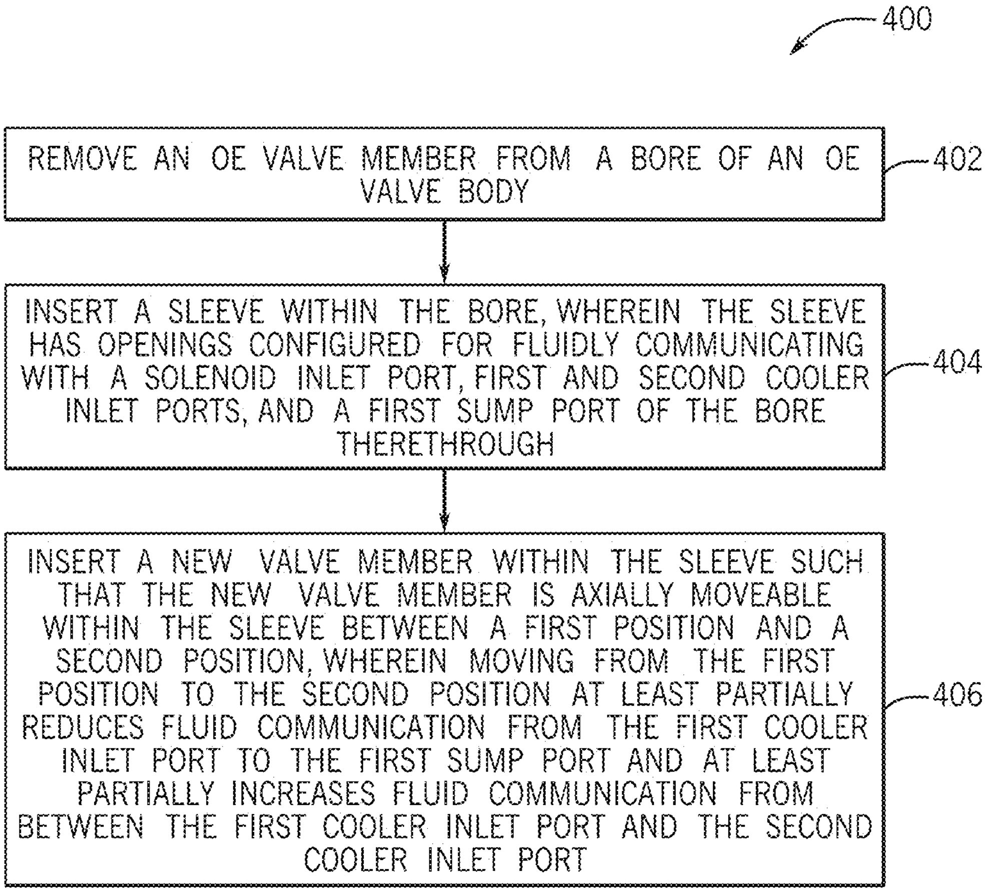
FIG. 9 is a flow chart depicting one method for modifying a lube flow control valve according to the present disclosure.

FIG. 9 depicts one method 400 for modifying a lube flow control valve according to the present disclosure. Step 402 provides for removing an OE valve member from a bore of an OE valve body. The OE valve body has an SLT solenoid inlet port in communication with the bore, first and second cooler inlet ports in communication bore, and a first sump port in communication with the bore, which was also discussed above. Step 404 provides for inserting a sleeve within the bore, wherein the sleeve has openings configured for fluidly communicating with the solenoid inlet port, the first and second cooler inlet ports, and the first sump port of the bore therethrough. Step 406 provides for inserting a new valve member within the sleeve such that the new valve member is axially moveable within the sleeve between a first position and a second position, wherein moving from the first position to the second position at least partially reduces fluid communication from the first cooler inlet port to the first sump port and at least partially increases fluid communication from between the first cooler inlet port and the second cooler inlet port. The various methods contemplated by the present disclosure may further include additional steps that are common with existing OE lube flow control valves (e.g., uninstalling clips that retain components in the bore, etc.) and are thus not described in detail for brevity. Further steps may include replacing other OE components with different counterparts, such as end plugs, springs, etc., as discussed above.

The resultant modified lube flow control valve may advantageously be controlled by the controllers of the vehicle in the same manner as the OE lube flow control valve, thereby allowing for replacements and upgrades without additional modifications to the vehicle controllers.

In the present disclosure, the words “a” or “an” are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as side(s), upper, lower, top, bottom, rearward, inboard, forward, outboard and the like may be for explanatory purposes only and may not be intended to limit the scope of the disclosure.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram.

Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A drop-in valve assembly for a lube flow control valve for an OE valve body, the OE valve body having a bore, a solenoid inlet port in communication with the bore, first and second cooler inlet ports in communication with the bore, and a first sump port in communication with the bore, the drop-in valve assembly comprising:

a sleeve configured to be positioned in the bore, wherein the sleeve has openings configured for fluidly communicating with at least some of the solenoid inlet port, the first and second cooler inlet ports, and the first sump port therethrough; and a valve member configured to be positioned in the sleeve in the bore and to axially move therein between a first position and a second position, wherein moving the valve member from the first position to the second position at least partially reduces fluid communication from the first cooler inlet port to the first sump port and at least partially increases fluid communication from between the first cooler inlet port and the second cooler inlet port, and wherein the drop-in valve assembly is configured to block at least one port of the OE valve body when installed therein.

2. The drop-in valve assembly according to claim 1, wherein in the first position the valve member at least partially blocks the second cooler inlet port.

3. The drop-in valve assembly according to claim 1, wherein the at least one port of the OE valve body comprises a dead passage in communication with the bore, and wherein the dead passage is blocked via an end plug when positioned in the bore with the sleeve and the valve member.

4. The drop-in valve assembly according to claim 1, wherein the valve member is biased towards the first position.

5. The drop-in valve assembly according to claim 1, wherein the openings in the sleeve are provided at least in part as castellations at an end thereof.

6. The drop-in valve assembly according to claim 1, wherein the valve member is configured such that in the first position the first cooler inlet port and the second cooler inlet port remain fluidly coupled within the sleeve and in the second position the first cooler inlet port and the first sump port remain fluidly coupled within the sleeve.

7. The drop-in valve assembly according to claim 1, wherein the valve member has a first section, an adjacent second section of a second diameter, an adjacent third section of a third diameter less than the second diameter, and an adjacent fourth section of a fourth diameter that is greater than the third diameter, wherein the third section is axially aligned with the first sump port when in the first position and the second section is axially aligned with the first sump port when in the second position.

8. The drop-in valve assembly according to claim 7, wherein the third section is axially aligned with the first cooler inlet port when in the first position and when in the second position.

9. The drop-in valve assembly according to claim 8, wherein the fourth section is axially aligned with the second cooler inlet port when in the first position and axially non-aligned when in the second position.

10. The drop-in valve assembly according to claim 7, wherein the second diameter and the fourth diameter are each smaller than an inner diameter of the sleeve, and wherein the fourth diameter is smaller than the second diameter so as to correspondingly meter the fluid communication through the sleeve.

11. The drop-in valve assembly according to claim 7, wherein an interior of the sleeve has a circular cross-section, and wherein the second section of the valve member has a non- circular cross-section so as to permit the fluid communication from the first cooler inlet port to the first sump port therebetween.

12. The drop-in valve assembly according to claim 1, wherein the OE valve body further comprises a second sump port in communication with the bore, further comprising an end plug configured to retain the sleeve and the valve member in the bore, wherein the second sump port remains in fluid communication with the bore via a passage within the end plug.

13. The drop-in valve assembly according to claim 1, wherein in the second position between 10% and 25% of the fluid communication from the first cooler inlet port flows to the first sump port.

14. A method for modifying a lube flow control valve for an OE valve body, the OE valve body having a bore, a solenoid inlet port in communication with the bore, first and second cooler inlet ports in communication with the bore, and a first sump port in communication with the bore, the method comprising:

removing an OE valve member from the bore;

inserting a sleeve within the bore, wherein the sleeve has openings configured for fluidly communicating with the solenoid inlet port, the first and second cooler inlet ports, and the first sump port therethrough; and inserting a new valve member within the sleeve, the new valve member being configured to axially move within the sleeve between a first position and a second position, wherein moving the new valve member from the first position to the second position at least partially reduces fluid communication from the first cooler inlet port to the first sump port and at least partially increases fluid communication from between the first cooler inlet port and the second cooler inlet port, and wherein at least one port of the OE valve body is blocked by modifying the lube flow control valve.

15. The method according to claim 14, further comprising removing an OE end plug to gain access to remove the OE valve member from the bore, and further comprising inserting a new end plug in the bore to retain the sleeve and the new valve member therein, the new end plug having a greater length than the OE end plug.

16. The method according to claim 14, wherein the OE valve body further comprises a dead passage in communication with the bore, and wherein the at least one port of the OE valve body comprises the dead passage. further comprising positioning the new end plug in the bore so as to fluidly block the dead passage.

17. The method according to claim 14, further comprising removing an OE spring configured to bias the OE valve member towards the first position, and further comprising installing a new spring to bias the new valve member towards the first position, the new spring differing from the OE spring in at least one of a length, a diameter, and a spring constant.

18. The method according to claim 14, wherein the OE valve body further comprises a third cooler inlet port in communication with the bore, further comprising blocking the fluid communication from the bore to the third cooler inlet port.

19. The method according to claim 14, wherein the lube flow control valve when modified is configured such that when the new valve member is in the second position between 10% and 25% of the fluid communication from the first cooler inlet port flows to the first sump port.

20. The method according to claim 14, wherein the OE valve body further comprises a second sump port in communication with the bore, further comprising fluidly coupling an interior of the sleeve with the second sump port via inserting an end plug having a passage therethrough into the bore.

* * * * *